United States Patent
Fransen et al.

(10) Patent No.: US 9,820,134 B2
(45) Date of Patent: Nov. 14, 2017

(54) PROXIMITY DISCOVERY, AUTHENTICATION AND LINK ESTABLISHMENT BETWEEN MOBILE DEVICES IN 3GPP LTE

(71) Applicants: Koninklijke KPN N.V., The Hague (NL); Nederlandse Organisatie voor Toegepast-Natuurwetenschappelijk Onderzoek TNO, The Hague (NL)

(72) Inventors: Frank Fransen, Zuidhorn (NL); Peter Veugen, Voorburg (NL); Sander de Kievit, Leiden (NL); Maarten Everts, Groningen (NL)

(73) Assignees: Koninklijke KPN N.V., The Hague (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 14/762,742

(22) PCT Filed: Jan. 23, 2014

(86) PCT No.: PCT/EP2014/051318
§ 371 (c)(1),
(2) Date: Jul. 22, 2015

(87) PCT Pub. No.: WO2014/114711
PCT Pub. Date: Jul. 31, 2014

(65) Prior Publication Data
US 2015/0358804 A1 Dec. 10, 2015

(30) Foreign Application Priority Data
Jan. 25, 2013 (EP) .................................... 13152725

(51) Int. Cl.
*H04L 12/28* (2006.01)
*H04W 8/00* (2009.01)
(Continued)

(52) U.S. Cl.
CPC ............. *H04W 8/005* (2013.01); *H04L 12/18* (2013.01); *H04L 12/185* (2013.01);
(Continued)

(58) Field of Classification Search
CPC ... H04W 8/005; H04W 72/005; H04W 12/04; H04W 76/023; H04W 12/06;
(Continued)

(56) References Cited

U.S. PATENT DOCUMENTS

2006/0101280 A1    5/2006   Sakai
2010/0211698 A1*   8/2010   Krishnaswamy ..... H04W 4/003
                                                                                                 710/11
(Continued)

FOREIGN PATENT DOCUMENTS

WO    WO2007044597    4/2007
WO    WO2008061848    5/2008
(Continued)

OTHER PUBLICATIONS

International Searching Authority, International Search Report and Written Opinion, International Application No. PCT/EP2014/051318, dated Jan. 23, 2014, 12 pages.
(Continued)

*Primary Examiner* — Clemence Han
(74) *Attorney, Agent, or Firm* — McDonnell Boehnen Hulbert & Berghoff LLP

(57) ABSTRACT

The invention enables a device to discover one or more other devices within range for a device-to-device mode of communication. This proximity discovery may trigger a target device, e.g. to start listening to signals from a source device
(Continued)

or perform any other action based on the proximity discovery like e.g. charging at a toll gate. A source device that wants to be discovered broadcasts a message including an identifier or a representation of the identifier. This identifier may be an identifier of the target device to be contacted or of the source device or a derivation thereof or a common security association used by a set of peers. The target device compares the broadcast identifier with a known identifier to establish proximity discovery.

12 Claims, 5 Drawing Sheets

(51) Int. Cl.
| | |
|---|---|
| H04W 72/00 | (2009.01) |
| H04L 29/06 | (2006.01) |
| H04W 12/06 | (2009.01) |
| H04L 12/18 | (2006.01) |
| H04W 76/02 | (2009.01) |
| H04W 12/04 | (2009.01) |
| H04W 88/02 | (2009.01) |
| H04W 92/18 | (2009.01) |
| H04L 29/12 | (2006.01) |

(52) U.S. Cl.
CPC ........ *H04L 12/189* (2013.01); *H04L 12/1845* (2013.01); *H04L 63/0414* (2013.01); *H04W 12/04* (2013.01); *H04W 12/06* (2013.01); *H04W 72/005* (2013.01); *H04W 76/023* (2013.01); *H04L 61/2038* (2013.01); *H04L 61/6013* (2013.01); *H04W 88/02* (2013.01); *H04W 92/18* (2013.01)

(58) Field of Classification Search
CPC .... H04W 88/02; H04W 92/18; H04L 12/189; H04L 12/185; H04L 12/1845; H04L 12/18; H04L 63/0414; H04L 61/6013; H04L 61/2038
See application file for complete search history.

(56) References Cited

U.S. PATENT DOCUMENTS

| | | | |
|---|---|---|---|
| 2011/0153773 A1* | 6/2011 | Vandwalle | H04W 8/005 709/217 |
| 2011/0172741 A1* | 7/2011 | Roberts | A61N 1/37217 607/60 |
| 2012/0021684 A1* | 1/2012 | Schultz | H04B 5/0043 455/41.1 |
| 2012/0282922 A1 | 11/2012 | Fodor et al. | |
| 2012/0284517 A1 | 11/2012 | Lambert | |
| 2013/0005266 A1* | 1/2013 | Singh | H04W 4/008 455/41.2 |
| 2014/0096179 A1* | 4/2014 | Ben-Shalom | H04L 63/0869 726/1 |
| 2014/0141750 A1* | 5/2014 | Lazaridis | H04L 63/0492 455/411 |
| 2014/0204852 A1 | 7/2014 | Iwamura et al. | |

FOREIGN PATENT DOCUMENTS

| | | |
|---|---|---|
| WO | WO2010030516 | 3/2010 |
| WO | 2013009288 | 1/2013 |

OTHER PUBLICATIONS

Bluetooth, Security Specification, Bluetooth Specification Version 4.0 Excerpt, Jun. 30, 2010, pp. 1057-1114, vol. 2.

* cited by examiner

PROXIMITY DISCOVERY, AUTHENTICATION AND LINK ESTABLISHMENT BETWEEN MOBILE DEVICES IN 3GPP LTE

CROSS REFERENCE TO RELATED APPLICATIONS

The present application is a national stage entry of, and claims priority to, PCT/EP2014/051318, filed on Jan. 23, 2014, which claims priority to European Patent Application EP 13152725.1, filed in the European Patent Office on Jan. 25, 2013, both of which are hereby incorporated in their entirety herein by reference.

FIELD OF THE INVENTION

The present invention relates to proximity discovery of communication devices. More specifically the invention relates to proximity discovery of devices that may result in setting up a device-to-device communication session between the devices.

BACKGROUND

Recent developments in de 3GPP standard relate to Long Term Evolution (LTE) networks and devices. LTE, also known as 4G (i.e. fourth generation) mobile communications standard, is a standard for wireless communication of high-speed data for mobile phones and data terminals. It is a successor of GSM/EDGE (also known as 2G or 2.5G) and UMTS/HSPA (also known as 3G) network technologies, increasing the capacity and speed using a different radio interface together with core network improvements. Recent LTE extensions allow for device-to-device (D2D) communications, either directly or using the nearby base station as a relay, next to traditional communications that is exclusively between base stations and mobile devices. In LTE the device-to-device communication is also known as LTE-Direct communication.

Use cases for LTE-Direct communication are known from 3GPP technical report TR 22.803. In a first use case Alice is at a conference and would like to detect the proximity of her friend Bob. Alice turns on direct mode discovery for her friend Bob. Hereto Alice's phone sends a message to her mobile operator to tell that she would like to use direct mode and in particular be discoverable for Bob. The direct mode server of the mobile operator lists Alice and Bob as a pair. Then, if the network detects that Bob and Alice are close (e.g. they are located in the same network cell or by some other mechanism), it informs Alice and Bob and sends them information with which they can reliably identify each other without revealing their privacy. In a second use case is related to public safety services, such as fire brigade, police and ambulance services. For example a fireman entering a building with no coverage would like to be able to talk to colleagues. In this example devices can discover each other and setup a secure and authenticated connection.

When fixed and/or mobile devices, such as phones and machine type communication (MTC) devices, are in each other's proximity, a device-to-device communication session could be set up between the devices, e.g. using LTE-Direct in case of LTE mobile devices or any other device-to-device communication standard e.g. based on IEEE 802.11, IEEE 802.16, IEEE 802.20, Bluetooth, Wi-Fi or WiMAX. Hereto the devices typically detect each others presence and inform the user about the proximity of another device.

In general, a network may assist in the discovery of the proximity of devices. Hereto the network determines that two devices are likely to be in each other's proximity and informs the respective devices of each other's likely proximity. The network may not be able to determine that the devices are also within reach in which case the devices have to perform a further proximity test, e.g. by broadcasting an identifier to be picked up by other nearby devices.

Alternatively, discovery of proximity is performed directly by the devices. In this case, the devices typically broadcast identifiers and discover other devices in the broadcast identifiers. Bluetooth devices are known to have such proximity discovery capabilities.

In either solution (network assisted or direct discovery of proximity), identifiers of the respective devices are broadcast or transmitted otherwise by the respective devices. Typically the identifiers are static, making it possible to trace an individual device by simply listening to the broadcast identifier at regular intervals. Such a breach of user's privacy is highly undesirable.

Another drawback of known proximity discovery solutions is that they are used for the discovery of individual devices. There is a need for a selective discoverability solution that enables both proximity discovery of an individual device and proximity discovery of a group of devices. A user would then e.g. be able to adjust the discoverability of his/her device such that it only identifies itself to a limited number of devices, for example at a conference only to devices of colleagues or at a pop concert only to devices of friends. Other devices in range for device-to-device communication preferably shouldn't be able to learn about the proximity of devices in the group.

There is a need for a solution that enables proximity discovery of devices in a controlled radio network which respects privacy, allows for selective discoverability and preferably has a low profile in terms of network load and necessary computing power.

SUMMARY OF THE INVENTION

It is an object of the invention to provide for a solution that enables proximity discovery of devices in a controlled radio network which respects privacy, allows for selective discoverability and preferably has a low profile in terms of network load and necessary computing power. The invention is particularly useful, but not limited, to devices that are capable of device-to-device communication and want to discover nearby devices for a device-to-device communicate session.

According to an aspect of the invention a method is proposed for proximity discovery between a source device and one or more target devices. The method comprises receiving in the source device a first data comprising an identifier. The method further comprises receiving in the target device a second data comprising a first representation of the identifier. The method further comprises broadcasting by the source device a signal comprising a second representation of the identifier. The method further comprises receiving in the target device the signal. The method further comprises comparing in the target device the first representation of the identifier with the second representation of the identifier to obtain a comparison result for establishing a successful proximity discovery.

The thus obtained comparison result typically indicates whether or not the identifiers in the first and second representation of the identifiers can be matched. If this is the case then it may be concluded that the proximity discovery is successful.

Instead of the identifier, the source device advantageously broadcasts a derivation of the identifier that only a specified target device or group of target devices can relate to the source device. Thereby the target device is able to learn who is broadcasting and e.g. conclude that the source device is in close range, e.g. in range for a device-to-device communication session, or trigger any action based on the source device being in close range, e.g. charging at a toll gate. In the mean time the identity of the source device is not traceable.

In an embodiment of the invention the method can further comprise transmitting from the target device to the source device an acknowledgement message depending on the comparison result. This advantageously enables the source device to learn that the target device is in close range.

In another embodiment the identifier can be a temporary broadcast identifier uniquely identifying the target device and the identifier can be associatable with the source device by the target device. This advantageously enables the source device to transmit an identifier that to an eavesdropper appears not to be linked to the source device, making the source device untraceable. The target device is able to associate the identifier to the source device.

In another embodiment the source device and the one or more target devices can form a group of devices and the identifier can identify the group of devices. This advantageously enables proximity discovery of a group of target devices instead of just one target device.

In another embodiment the identifier, the first representation of the identifier and the second representation of the identifier can be identical.

In another embodiment the source device and the one or more target devices can be configured to be communicatively connected to a network and the first data and the second data can be received from a server in the network. Alternatively, the first data and the second data can be received from the source device. This advantageously enables a network to be involved or operating in a stand-alone mode without network.

In another embodiment of the invention the method can further comprise receiving in the target device a third data comprising a third representation of the identifier. The first representation of the identifier can be a derivation of the identifier obtained by a first mathematical function that uses the identifier and a random number as input to calculate the derivation of the identifier. The third representation of the identifier can be the random number. The comparing step can comprise calculating the derivation of the identifier using a second mathematical function identical to the first mathematical function that uses the second representation of the identifier and the third representation of the identifier as input. The comparing step can further comprise comparing the calculated derivation of the identifier with the first representation of the identifier. The random number can be a random number generated in the server or in the source device. Alternatively the random number can be a salt generated in the server or in the source device. Alternatively the random number can be a derivation of a further random number obtained in the server or in the source device by a third mathematical function that uses the further random number and an source identifier identifying the source device as input to calculate the derivation of the random number.

This advantageously adds a level of obscurity to the exchanged identifiers making it more difficult to track the devices.

In another embodiment the second data can further comprise a ticket identifier. The method can further comprise receiving from the server in the source device ticket data comprising the ticket identifier, the first data and a fourth data. The method can further comprise transmitting from the target device to the server the ticket identifier to obtain a copy of the fourth data associated with the ticket identifier. The method can further comprise receiving from the server in the target device the copy of the fourth data. The acknowledgement message can comprise the copy of the fourth data for verification with the fourth data in the source device.

Ticketing advantageously makes it possible to track the proximity discovery attempts. The tracking may e.g. be used to log or charge for the proximity discovery attempts.

In another embodiment the method can further comprise charging by an operator of the server of a request for the first data, the second data and/or the ticket data from the source device or the target device. This advantageously enables charging for the proximity discovery attempts, possibly only successful proximity discovery attempts.

In another embodiment the method can further comprise receiving from the source device in the target device first challenge data. The method can further comprise calculating in the target device derived first challenge data using a fourth mathematical function, e.g. a hash function, on the first challenge data. The acknowledgement message can further comprise the derived first challenge data and second challenge data. The method can further comprise calculating in the source device the derived first challenge data using a fifth mathematical function identical to the fourth mathematical function on the first challenge data for comparison with the received derived first challenge data. The method can further comprise calculating in the source device derived second challenge data using a sixth mathematical function on the second challenge data. The method can further comprise transmitting the derived second challenge data to the target device. The method can further comprise calculating in the target device the derived second challenge data using a seventh mathematical function identical to the sixth mathematical function on the second challenge data for comparison with the received derivated second challenge data.

This advantageously adds a level of security to the exchange of identifiers in the form of a challenge-response authentication.

In another embodiment the ticket data can further comprise an encryption key. The method can further comprise receiving from the server in the target device the encryption key associated in the server to the ticket identifier. The fourth, fifth, sixth and seventh mathematical function can comprise a cryptographic function using the encryption key.

This advantageously adds a level of security to the exchange of identifiers.

According to an aspect of the invention a source device is proposed that is configured for performing a proximity discovery procedure with one or more target devices using one or more steps of the method described above.

According to an aspect of the invention a target device is proposed that is configured for performing a proximity discovery procedure with a source device using one or more steps of the method described above.

According to an aspect of the invention a network is proposed that comprises a source device as described above and one or more target devices as described above.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
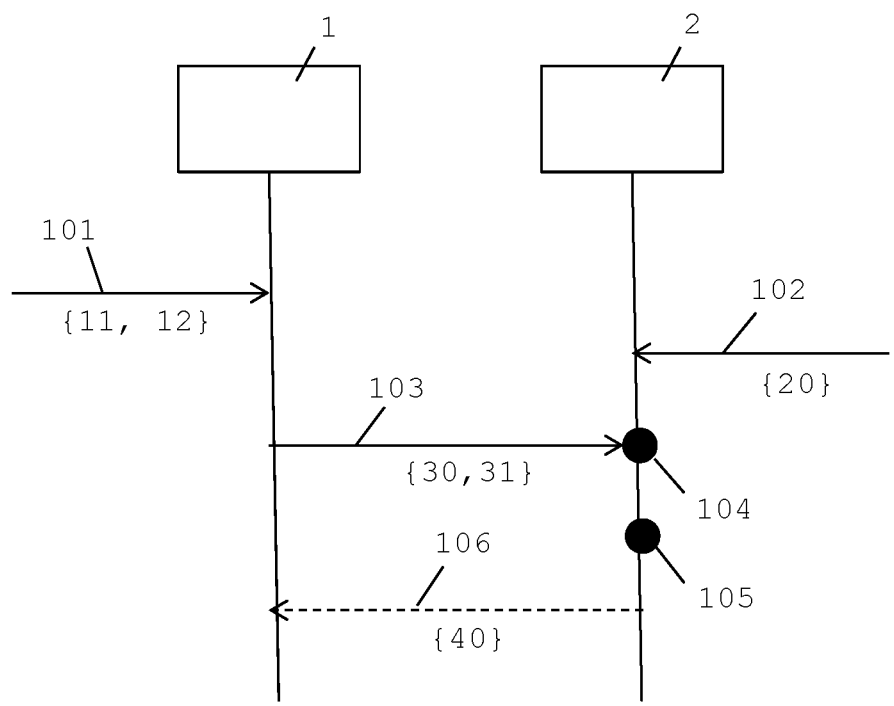
FIGS. 1-6 are proximity discovery procedures according to exemplary embodiments of the invention visualized as a time sequence diagrams between a source device, a target device and optionally a server.

In the following description the wording "device", "terminal" and "user equipment (UE)" are to be understood as synonyms of a fixed or mobile end-user or MTC device. A "peer" is to be understood as any fixed or mobile end-user device that can be involved in device-to-device communication.

In a device-to-device mode of communication the devices communicate directly, i.e. without using a fixed or wireless network. Device-to-device communication links may use a base station for relaying signals between the devices, but no further network functionality of the network of the base station will be used. Peers may be connected to a wireless or fixed network next to the device-to-device mode of communication.

The invention enables a device to discover one or more other devices within range for a device-to-device mode of communication. This proximity discovery may trigger a target device, e.g. to start listening to signals from a source device or perform any other action based on the proximity discovery like e.g. charging at a toll gate. The proximity discovery may result in setting up a device-to-device communication between the source device and the target device.

Identities of devices or representations of the identities are exchanged to enable the proximity discovery. This exchange of identifiers is done in such manner that devices are not traceable by listening to or eavesdropping on the transmissions of the devices and picking up the transmitted identifiers. By not being traceable, the privacy of users of the devices is increased.

To set up a device-to-device communication session between two or more devices having a fixed or wireless connection to a network, a device may optionally trigger other devices before starting the proximity discovery procedure by indicating to a server in the network that it would like to be discoverable or discover a certain (set of) peer(s). Prior to the proximity discovery procedure, a network, a third party (e.g. an over-the-top provider or any other third party) or the devices themselves typically detect that peers are nearby.

As a part of the proximity discovery procedure, a source device that wants to be discovered broadcasts a message including an identifier or a representation of the identifier. This identifier may be an identifier of the target device to be contacted or of the source device or a derivation thereof or a common security association used by a set of peers. Preferably the device does not broadcast its own identifier in the clear to avoid traceability of the device.

The identifier may be a temporary broadcast identifier (T-BID) and may change over time. The T-BID may be changed by provisioning by another party, e.g. by the network providing the devices with new identifiers or by an over-the-top service, i.e. a party outside the network such as Facebook, Google+ or Whatsapp, providing new identifiers. The T-BID may be changed by means of a communication session between two devices which goes over the network (i.e. not using a device-to-device mode of communication) or any other connection such as e.g. WiFi, Bluetooth, NFC or camera and screen communication, e.g. by having the devices exchange new temporary identities or a random/algorithm for calculating a new temporary identifier. The T-BID may be changed by means of an algorithm that includes e.g. time, the number of times that a device-to-device connection has been setup between the two (or more) devices, a random or salt that is provided by a third party such as a network operator or over-the-top service provider, and/or a random that is transmitted simultaneously with an encrypted/hashed identifier.

As a part of the proximity discovery procedure, a target device extracts the necessary information from the broadcast message (e.g. by deciphering, rehashing or simply comparing to a list known identities). The source device broadcast its identity in a way that only a specified target device can learn who is broadcasting.

Optionally the target device responds by sending an acknowledgement message to the source device that it heard the other device and that it is available for a device-to-device communication. The optional acknowledgement message may contain a response to a challenge that may included in the initial broadcast. The optional acknowledgement message may contain data from which it can be established that a common secret is known by a source device and a target device for authentication purposes.

After a successful proximity discovery, a device-to-device connection may be set up between the devices.

The proximity discovery procedure may be used to setup a secure device-to-device connection. It may be desirable to verify that the two devices can authenticate each other (e.g. to prevent a man in the middle attack) and that the network has some sort of control over how the connection is setup (e.g. for charging the proximity discovery). The proximity discovery may thereto include a three-way handshake procedure that may be implemented as follows:

1. The source device sends a random (the challenge) to a target device in the same broadcast as the T-BID;

2. The target device calculates hash(challenge||common secret), where the common secret can be e.g. a random, a salt or a common T-BID. The target device generates a further random replies with a message including further random-||hash(challenge||common secret);

3. The source device can verify hash(challenge||common secret) and replies with a message including hash(further random||common secret);

4. The target device can verify hash (further random||common secret) and now both the source device and the target device know that both have the same common secret and have authenticated each other.

In the following exemplary embodiments of the invention the proximity discovery procedure outlined above will be explained in more detail.

Different kind of identifiers may be used in the proximity discovery procedure, examples of which are a broadcast identifier (BID), temporary broadcast identifier (T-BID), group specific broadcast identifier (G T-BID), friend specific (temporary) broadcast identifier (F(T)-BID) and security association (temporary) broadcast identifier (SA(T)-BID). A broadcast identifier is a globally unique identifier that is broadcast over a shared medium to announce ones presence or to call someone. A device may broadcast either their a derivation of a BID or the BID of the "friend"/other device to be called. A temporary broadcast identifier is a broadcast identifier that is used only for a limited amount of time or usage or geographical location. An exceptional to this rule is where a so-called "one time T-BID" is derived from the T-BID and is broadcast instead. A group specific (T-)BID is a broadcast identifier that refers to a group. This means that all devices in the group listen for this BID. A friend specific (T-)BID is a broadcast identifier that is shared between two friends/devices only. A security association (T-)BID is a broadcast identifier that is referring to a security association. This means that if two devices share a security association, they listen for the same broadcast identifier.

Typically a proximity detection precedes the proximity discovery procedure. In the proximity detection phase devices receive information that they are close. In the proximity discovery procedure one or more of the devices that received the information that they are close determine whether or not a device-to-device communication is possible. There are multiple ways of performing a proximity detection. For example, a network may detect and inform that two peers are close. This may be advantages, firstly because the device only has to broadcast an identifier once it is informed by the network which leads to lower battery drain and lower usage of the broadcast channel, and secondly because the network can (in the same message) provide identifiers and (optionally) cryptographic material. Additionally or alternatively, an over-the-top service provider or third party informs the peers that they are close. Additionally or alternatively, users may activate devices that are in each other's proximity. This may be advantageous for those situations in which there is no network coverage and one would like to setup a device-to-device connection. In the case that there is network coverage this method may still be advantageous for example for peers that don't know each other yet, e.g. in case you meet a new person and would like to exchange phone numbers.

FIGS. 1-6 show exemplary embodiments of the invention, wherein proximity discovery procedures are visualized as a time sequence diagrams between a source device 1, a target device 2 and optionally a server 3 in a network. It is to be understood that there may be multiple target devices 2. The arrows indicate data flows. The black dots indicate performed actions at a device. Reference numbers in between brackets "{ }" indicate data elements. Dashed lines indicate optional steps.

In FIG. 1 a first data 11 containing an identifier 12 is received 101 in the source device 1. The first data 11 may originate from an external server or from the source device 1 itself. In the latter case the source device 1 generates the identifier 12. A second data 20 containing a first representation 21 of the identifier 12 is received 102 in the target device 2. The second data 20 may originate from the external server or from the source device 1. Next, the source device 1 broadcasts 103 a signal 30 containing a second representation 31 of the identifier 12, which is received 104 in the target device 2. The target device 2 compares 105 the first representation 21 of the identifier 12 with the second representation 31 of the identifier 12. The thus obtained comparison result indicates whether or not the identifiers in the first and second representation of the identifiers can be matched. If this is the case then it may be concluded that the proximity discovery is successful, which may optionally be reported 106 to the source device 1 in an acknowledgement message 40.

Figure 2:
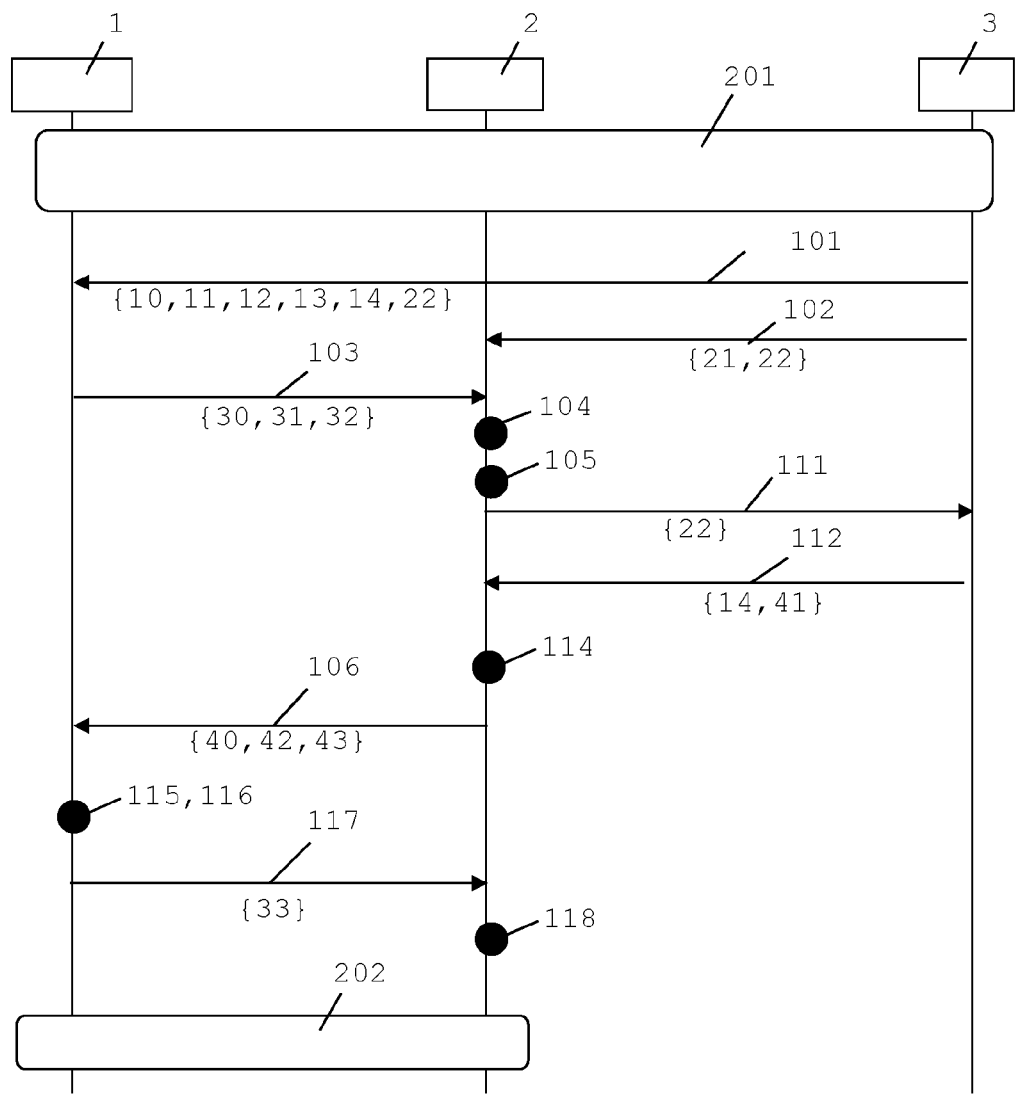

FIG. 2 shows a ticket based and network assisted embodiment that advantageously enables charging by a network operator of the proximity discovery by detecting usage of the tickets.

Prior to the proximity discovery, source device 1 informs 201 a server 3 in the network or at a third party that it would like to discover one or more target devices 2. The network or third party may know which of these aforementioned target devices 2 are discoverable or able to discover and lists these as peers, e.g. because the devices have a subscription at the network or third party and are being tracked or because the devices informed the network or third party.

The server 3 provides 101 the source device 1 with a ticket 10 in the form of ticket data 11 in which the source device 1 is given an identifier 12 to broadcast 103 to reach each of its peers 2. The network 3 also informs 102 the peers 2 of the source device 1 about the identifier 21 that they should listen to. Identifier 21 may be identical to the identifier 12 or a first representation 21 of the identifier 12.

The network may optionally include in the ticket 10 a security association 14, e.g. a cryptographic key, that the source device 1 may use to securely set up the connection to one of its peers 2. Similarly, the network 3 may already send the security association 14 to the target device 2, but from charging perspective it may be desirable to send the entire ticket once the target device 2 requests it. The reason is that in that case, the network can be certain of a successful discovery which means that it allows for charging. Alternatively, the network may send the keys 14 when the network 3 detects that two peers 1,2 are close. In this case the network 3 is involved in the proximity detection or the setup of the connection. This is advantageous for key freshness. Furthermore the network 3 does not have to keep a registry with keys for all devices that are peers.

The network 3 may send the identifiers 12 and/or the derivation 21 of the identifier 12 at the point of proximity detection.

For each of its peers 2 the source device 1 now has a ticket 10 which contains the following information: a ticket identifier 22; optionally a common secret or random to be used in an optional challenge response system; an identifier 12,21 such as a T-BID that the first device 1 can use to reach the target device 2; optionally a further identifier 13 such as a T-BID that the target device 2 can use in its response to reach the first device 1. The further identifier 13 is also known as the fourth data in the exemplary embodiments.

Optionally, a master cryptographic key from which other keys can be derived or a set of keys (cypher keys and integrity protection keys) may be included in the ticket data 10.

Each of the peers 1,2 now has the following information in memory: T-BID 12,21 (or a representation thereof) to listen for and relate to the source device 1; optionally the same common secret or random; the ticket identifier 22; optionally a master cryptographic key from which other keys can be derived or a set of keys (cypher keys and integrity protection keys).

At some later point in time, the network or third party/over-the-top provider may detect that the source device and the target device are nearby (and are still discoverable for each other, i.e. none of the users has changed their settings). The network or third party informs the first device that they are close.

Here the advantage of the ticket based system becomes clear: it doesn't have to be the network that does the proximity detection, which means that once the network has issued the ticket 10 including keys 14 it may only provide the keys 14 to the target device 2 and bill the source device 1.

The first device 1 broadcasts 103 a signal 30 containing the earlier received temporary broadcast identifier or a second representation 31 thereof, which is received 104, 105 by the target device 2.

Optionally the mechanism may be extended with a challenge response system. In this case the broadcast 103 of the identifier 31 could be done together with a challenge 32 (also called the first challenge data 32 in the exemplary embodiments), to which the target device 2 can provide the correct answer.

After the target device 2 received the broadcast it optionally answers 106 the target device 1 that it got the message using an acknowledge message 40. Optionally, as said above, the target device 2 retrieves 111, 112 the full ticket (including the keys) from the network upon receipt of the broadcast message 103. Optionally, the target device 2 calculates 114 its answer 42 to the challenge 32, optionally encrypts it and replies 106 to the first device 1.

The answer 106 to the challenge 32 may be of the form hash(challenge 32∥common secret). Upon receipt, the source device 1 may do the same calculation and verify 115 that the answer is the same. The advantage of also encrypting the reply is that the reply isn't vulnerable to a brute force or rainbow attack on the hash function. Although, without encryption the solution is still secure.

The target device 2 may also include a challenge 43 (also called the second challenge data 43 in the exemplary embodiments) in his reply. This may be another random generated by the target device 2.

The source device optionally calculates 116 the hash (challenge 43∥common secret) and replies 117 with this derived second challenge data value 33 to the target device 2, which in turn can verify 118 that the source device 1 has correctly calculated hash(challenge 43∥common secret). Based on the security association that both now have a secured and authenticated connection 202 may optionally be set up.

A single ticket 10 may be used multiple times, however, it is advised to limit usage to a low number of times to avoid tracking of the broadcast T-BIDs. That means that also after unsuccessful broadcast of T-BID (e.g. the peer could not be reached) a new ticket 10 may have to be issued It is conceivable that one would like to reuse the same ticket without being traceable. Hereto the solutions presented in FIG. 4 and FIG. 6 and the solution described below for group addressing may be used in addition to FIG. 2.

Figure 3:
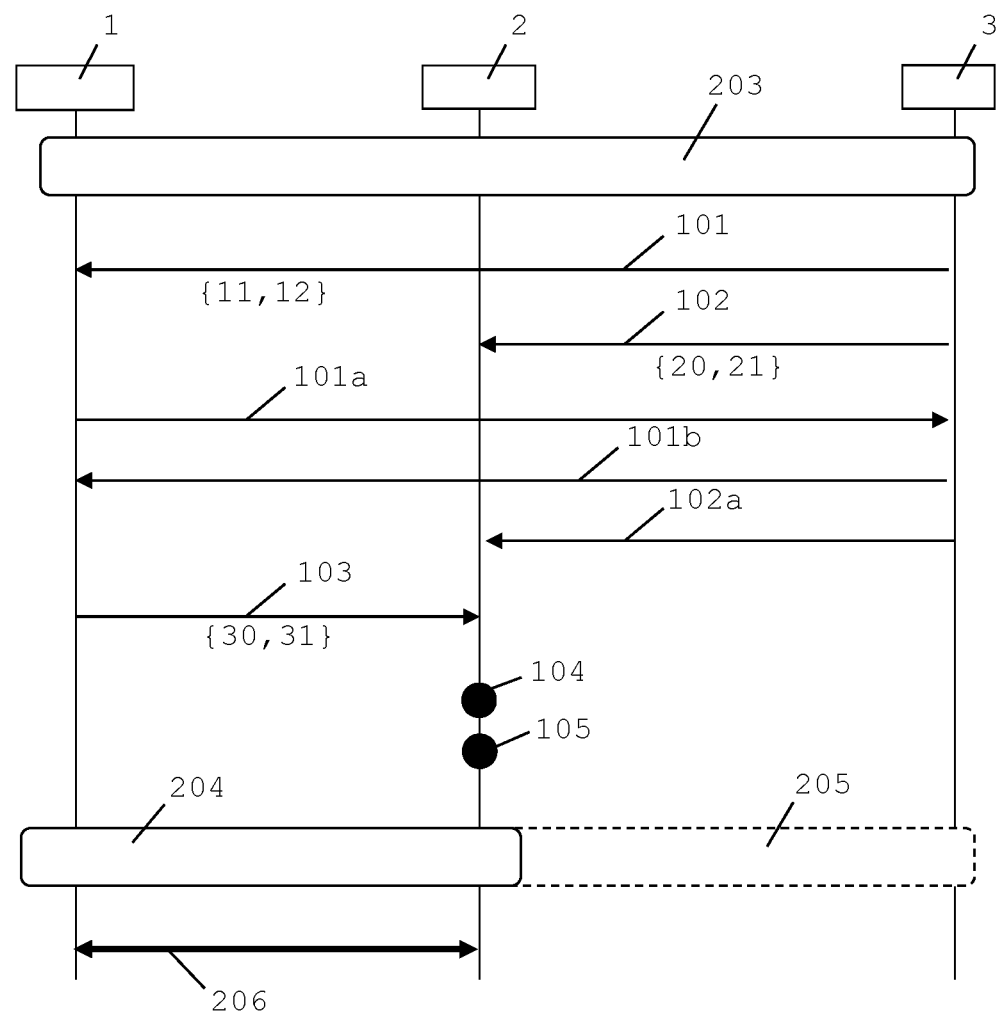
Figure 4:
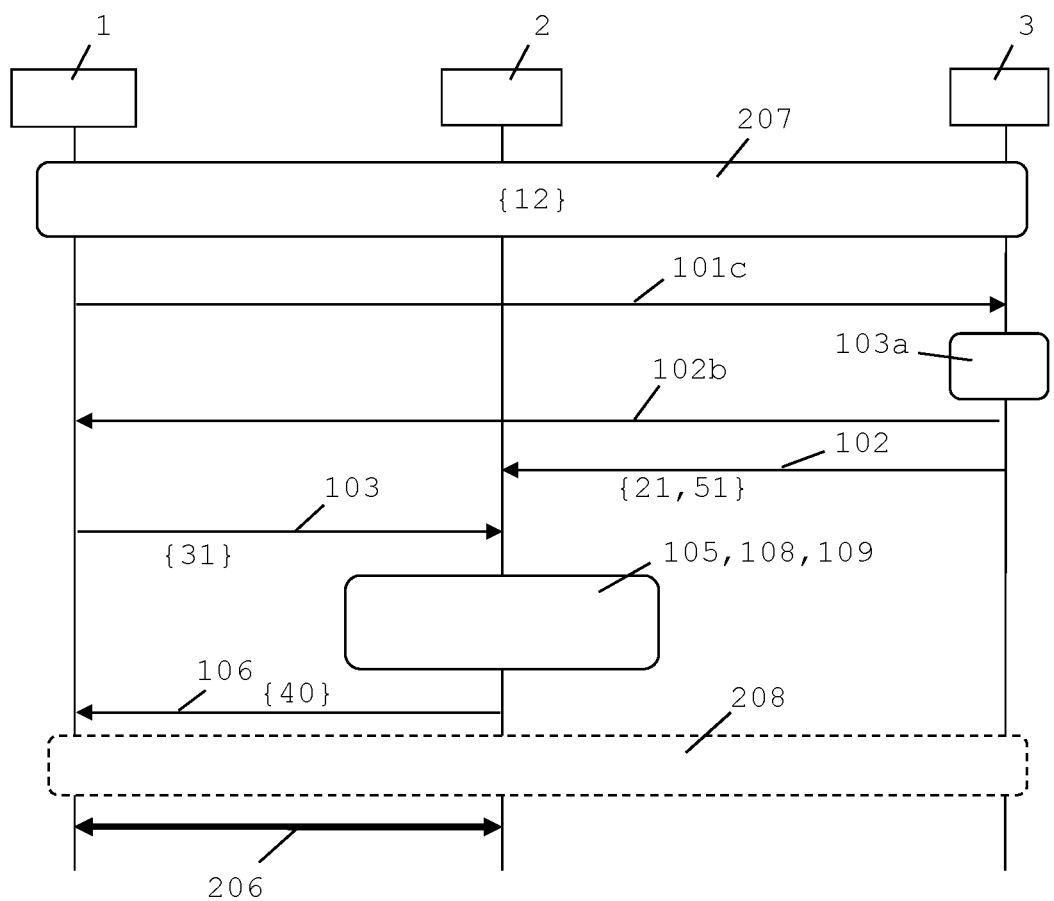

In the network assisted embodiments shown in FIG. 3 and FIG. 4 identifiers are preloaded in the peers 1,2 and the network is informed in advance that the source device 1 and the target device(s) 2 are peers.

With reference to FIG. 2, prior to the proximity discovery the source device 1 informs the network 3 that it would like to discover one or more target devices 2. The network 3 knows which of these aforementioned target devices 2 are discoverable or able to discover and lists these as pairs. The network may thus detect that a source device 1 and a target device 2 are nearby and informs both.

These steps prior to the proximity discovery is indicated by block 203.

At some specified interval (e.g. during the night or any other time interval), the peers 1,2 are given 101,102 a set of T-BIDs 12,21 (or other identifier 12,21) that may be used in the proximity discovery for each of the devices 1,2. Hereto the identifiers 12 are received 101 in first data 11 from the network in the source device 1 and the identifiers 21, which may in this example be identical to the identifiers 12, are received 102 in second data 20 from the network in the target device(s) 2. The T-BIDs 12,21 in this example are peer specific T-BIDs. Also, peers 1,2 are provided 101,102 with the T-BID 12,21 which the other device will use. Optionally, the peers 1,2 also receive 101,102 a General T-BID 12,21 (Gen T-BID) which can be used for discoverability of a group of devices. This Gen T-BID 12,21 is also distributed to each paired devices. Each peer 1,2 now has a registry that may looks like the following table (this example is valid for the source device 1):

|  | Broadcast | Receive | |
| --- | --- | --- | --- |
|  | T-BID | Gen T-BID | T-BID |
| General T-BID | a |  |  |
| T-BID for $1^{st}$ target device | b | f | j |
| T-BID for $2^{nd}$ target device | c | g | k |
| T-BID for $3^{rd}$ target device | d | h | m |
| T-BID for $4^{th}$ target device | e | i | n |

On the broadcast side of the table are the T-BIDs 31 (i.e. "b", "c", "d" and "e") that will be broadcast 103 in a signal 30 from the source device 1 and received 104 in a target device 2 in case the source device 1 would like to contact any specific of the target devices 2 or be discoverable for anyone using the General T-BID 31 (i.e. "a"). On the receiving side of the table are the broadcasts that the source device 1 should listen to in case of peer discovery. So, if the source device 1 would like to reach the $1^{st}$ target device 2 it should broadcast 103 "b". Alternatively, if the source device 1 would like to be discoverable for anyone who has its general T-BID it broadcasts 103 "a". On the receiving side, the source device 1 should listen for the two last columns. If any of the values in the last column ("j", "k", "m", "n") is broadcast, it can conclude 105 that one of its peers 2 is nearby and is trying to reach the source device 1. If any of the values in the middle column ("f", "g", "h", "i") is broadcast the source device 1 knows that one of its peers 2 is nearby and that they broadcast their general T-BID just to let know they are present.

It is to be understood that the manner of storing the registry is arbitrary. The table format is just an example, any other form of storing the values may be used. The identifiers 12,21 are presented as letters of the alphabet. It is to be understood that the identifiers can have any binary value, decimal value, hexadecimal value, word value, dword value, string value, and etcetera of any length.

The embodiment of FIG. 3 allows for simply broadcasting a Gen T-BID 31 or a number of specific T-BIDs 31 without having prior knowledge about who is nearby. This will also work if a peer 1,2 is currently not under network coverage or control, e.g. when it is (possibly temporary) operating in an ad-hoc mode.

If a security association is not known at the point in time of a device-to-device connection 206 and such security association 204 is desired, the network 3 may optionally provide cryptographic keys to the devices 1,2, preferably over a secure line. Advantageously the network is then also informed 205 that the discovery has worked, which advantageous enables charging.

It may be desirable to have a mechanism to change the General BID 12,21 or peer specific T-BID 12,21. For example, once a T-BID 31 has been broadcast 103 (and independent of whether a device-to-device session 206 was setup successfully) it is possible that a malicious user would save this T-BID and keep looking for it in the future. If at any point in time the same T-BID is broadcast again, a malicious user could conclude that a particular device is nearby. It is therefore optionally possible that a source devices 1 ask 101a the network 3 to update their T-BID 12. The network 3 then assigns a new T-BID 12 and informs 101b,102a the peers 1,2 of the new T-BID 12,21.

It is possible that the network reassigns T-BIDs 12,21 for every time that a T-BID 12,21 is used in broadcast and redistribute 101b,102a these to all peers 1,2.

Next to the BID and the peer specific T-BID, the network may optionally provide specific T-BID for being discoverable only to specific group of friends/devices. A closed user group specific T-BID (CUG T-BID) may thus be defined for larger groups. Such CUG T-BID identifiers are preferably also provided to everyone in the group. This is advantageous for those groups that are static, such as e.g. colleagues or public safety services such as the police and fire brigade.

The peer specific T-BID may optionally be refreshed during a device-to-device connection without involving or informing the network. This provides an increased degree of privacy (the network even doesn't know the identities 12,21) and it relieves the network of the task of generating T-BIDs.

In the embodiment of FIG. 4 the identifiers 12 are preloaded and static. However, the broadcast T-BIDs 31 may change e.g. by the network 3 (before broadcasting takes place) providing the source device 1 and target device 2 with a random 51 which the source device 1 uses to calculate 103a a derivation of the identifier, e.g. by encrypting or hashing the identifier 12, and the target device 2 can use to decipher and verify 109 the identifier.

The embodiment of FIG. 4 is particularly advantageous in the case of quickly changing groups, in which the group members have each other's identifiers, but do not all get the same randoms.

In the following first example with reference to FIG. 4, prior to the proximity discovery the peers 1,2 are assigned 207 a T-BID called $p_i$ ($p_1$ for the source device 1, $p_2$ for a $1^{st}$ target device 2, $p_3$ for a $2^{nd}$ target device 2, etc).

The operator 3 receives a message 101c from the source device 1 that it would like to discovery a $1^{st}$, $2^{nd}$, $3^{rd}$ and $4^{th}$ target device 2. The operator 3 detects that the $1^{st}$, $2^{nd}$ and $4^{rd}$ target devices 2 are close. A $5^{th}$ and $6^{th}$ target device may be close too but not in the list of the source device 1. The $5^{th}$ and $6^{th}$ target devices are therefore not to be discovered.

The operator 3 takes a random number x, which is of the length $p_i^2$ and calculates for the $1^{st}$ target device 2: $x_2$=x mod $p_2$ for $p_2$; and the same for the $3^{rd}$ target device 2 (not for the $2^{nd}$ and $4^{th}$ target device, because they are not close in this example). Alternatively, the source device 1 provides the operator 3 the random number x.

The operator 3 sends 102b x to the source device 1. The operator 3 sends 102 $x_2$ to the $1^{st}$ target device 2 and $x_4$ to the $3^{rd}$ target device 2. Herein $x_2$ and $x_4$ are representations 21 of the identifier 12.

The source device 1 broadcasts 103 the random x 31 and all peers 2 within reach (hopefully including the $1^{st}$ target device 2 and the $3^{rd}$ target device 2) can verify 109 whether $x_i$=x mod $p_i$. The value x 31 now functions as a second representative of the identifier, as it may be used to verify 105 the identity in the target device 2.

The $1^{st}$ and $3^{rd}$ target devices 2 may respond 106 that the message was received and the devices can setup a device-to-device communication session 206, possibly using a security association received 208 from the server 3.

The $5^{th}$ and $6^{th}$ target devices will also have received the random x 31, but their information is too limited (they did not receive the $x_i$ values from the operator 3) to find out who is calling or to use it for tracking and tracing.

It is possible for the source device 1 to reuse a modified version of r 31 for a next broadcast 103. This is possible if the first device 1 knows the values of $p_i$ of the target devices 2. If he knows, he can use (a multiple of) the least common multiplier (LCM) of both to obtain a new x for which $x_i$=x mod $p_i$ still holds, i.e. x'=x+k LCM($p_2$,$p_3$, etc). Herein, k should not be taken prime and preferably be taken a multiple of primes in order to prevent giving away too much information on the LCM of the used identifiers. The benefit of this solution is that for the target devices nothing changes, their reply is still the same.

In the following second example with reference to FIG. 4, prior to the proximity discovery the peers 1,2 are assigned 207 a T-BID called $p_i$ ($p_1$ for the source device 1, $p_2$ for a $1^{st}$ target device 2, $p_3$ for a $2^{nd}$ target device 2, etc). The peers 1,2 are informed about each other's identity, so for example, the source device 1 knows the T-BID of the $1^{st}$ target device 2 and the $2^{nd}$ target device 2 knows the T-BID of the source device 1.

The operator 3 receives a message 101c from the source device 1 that it would like to discovery a $1^{st}$, $2^{nd}$, $3^{rd}$ and $4^{th}$ target device 2. The operator 3 detects that the $1^{st}$, $2^{nd}$ and $4^{rd}$ target devices 2 are close. A $5^{th}$ and $6^{th}$ target device may be close too but not in the list of the source device 1. The $5^{th}$ and $6^{th}$ target devices are therefore not to be discovered.

The operator 3 takes a random number r and calculates x=hash(T-BID$_{source\ device\ 1}$∥r) and again $x_i$=x mod $p_i$ for the $2^d$ and $4^{th}$ target devices 2. Alternatively, the source device 1 provides the operator 3 the random number r.

The operator 3 sends 102b the random r to the source device 1. The operator 3 sends 102 ($x_2$,r) to the $1^{st}$ target device 2 and ($x_4$,r) to the $3^{rd}$ target device 2. Herein $x_2$ and $x_4$ are representations 21 of the identifier 12.

The source device 1 broadcasts 103 the x 31 and all peers 2 within reach (hopefully including the $1^{st}$ target device 2 and the $3^{rd}$ target device 2) can verify 109 whether $x_i$=x mod $p_i$. The value x 31 now functions as a second representative of the identifier, as it may be used to verify 105 the identity in the target device 2.

The $1^{st}$ and $3^{rd}$ target devices 2 may respond 106 that the message was received 40 and proof that it authenticity by returning a hash($p_i$∥r) calculated 108 in the target device 2.

As in the previous embodiments, the network 3 may be involved in exchanging cryptographic keys 14 providing additional security and enabling charging a successful proximity detection.

The examples of FIG. 4 also works for the case that one device 1,2 wants to discover only one other device 1,2. The network 3 then informs only these specific peers.

The following exemplary embodiments standalone proximity discovery procedures are described, wherein the devices 1,2 themselves decide what to broadcast for discoverability. The network 3 or a third party may still be involved in informing the devices 1,2 about likely proximity, i.e. be involved in a proximity detection. In the standalone proximity discovery procedures it is assumed that previously at any moment in time there has been contact or identifiers have been exchanged by other means such as using a near field chip in the source device 1 and the target device 2 (e.g. triggered by holding the devices 1,2 together and make a shaking gesture), scanning a barcode or tag on the other device's screen, user input of an identifier, using wifi, using a third party application such as Facebook or any other means.

Figure 5:
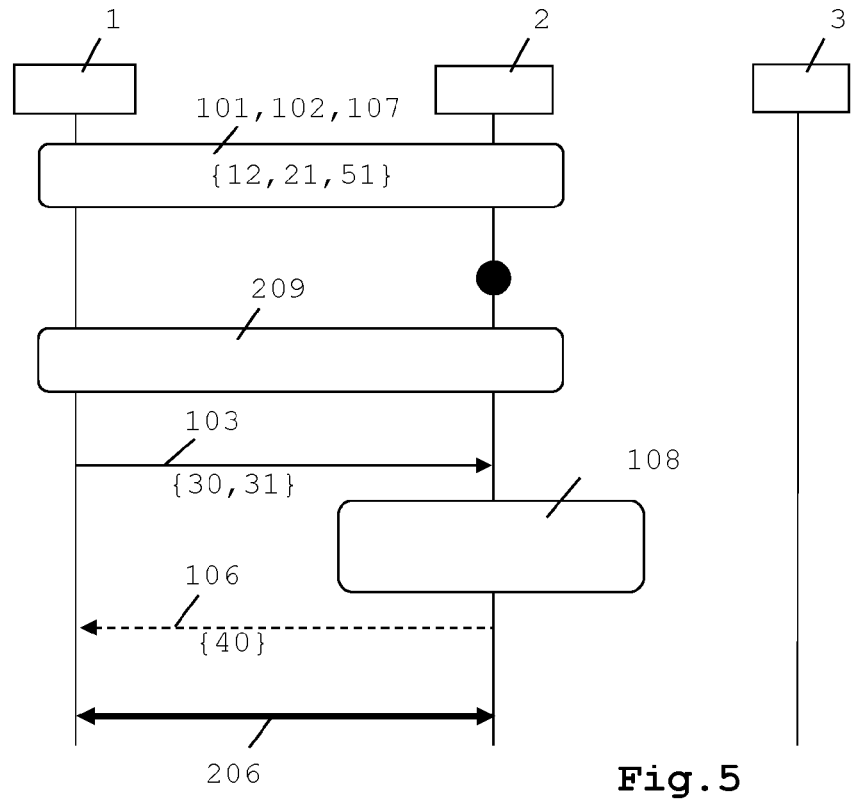

FIG. 5 shows a standalone proximity discovery procedure that is based on an inverse hash stack with an auto-forget option. The example of FIG. 5 is particularly useful in environments with many peers 1,2 that have a high probability to meet again. Peers 1,2 decide on their own what to broadcast 103 and how to encrypt or obfuscate the second representation 31 of the identifier 12 in the broadcast signal. The representation 31 of the T-BID that is broadcast may change over time such that tracking and tracing becomes very difficult.

A source device 1 and a target device 2 that are in a device-to-device communication session may both generate 101 a random T-BID 12 and a salt 51. Both device 1,2 recursively calculate the $n^{th}$ hash 21 using any hash function that takes as an input a previous hash and the salt 51. The first hash is then calculated as $hash_1$=hash(T-BID,salt) and all subsequent hashes are calculated as hash(previous_hash, salt). To calculate the $n^{th}$ hash 21, the following code may e.g. be used:

```
hash₁=hash(T-BID,salt);
i=2;while i<=n do {
    hashᵢ=hash(hashᵢ₋₁,salt);
}
```

Herein, the T-BID 12 is an identifier 12, the $n^{th}$ hash of the T-BID is a first representation 21 of the identifier 12 and the salt is a third representation 51 of the identifier 12.

The devices 1,2 exchange their $n^{th}$ hash and the salt in steps 102 and 107.

At this stage the source device 1 and target device 2 have enough information to contact each other at a later stage without having to contact the network 3 or any other third party.

The next time they are nearby, which is depicted by block 209, the source device 1 can broadcast as second representation 31 of the T-BID the n−$1^{th}$ hash 31 of the T-BID. The target device 2 can then calculate 108 hash($hash_{n-1}$,salt) =previous hash. A eavesdropper knowing the hash function will not know the salt 51 and can't therefore find out who is being called.

Optionally, the nearby devices 1,2 could be informed by the network 3 about their proximity in a proximity detection procedure prior to the proximity discovery procedure. That way, the need for constant monitoring of the broadcast signal and the related battery drain could be avoided.

Because both devices 1,2 posses many hashes, they may decide to use a different hash for e.g. every day or every time they are near. If they then broadcast 103 the second representation 31 of the T-BID as a hash, they may e.g. include in the broadcast signal 30 a counter value k indicating which hash they have broadcast. The value k may e.g. indicate that the (n−k)$^{th}$ hash (n minus k th hash) is included as second representation 31 of the identifier in the broadcast signal 30.

Optionally, k is given by a timer, e.g. based on the number of days or hours that passed since the last device-to-device communication session. This may be used to introduce an expiry method which will deplete the hash stack in time and eventually breaks the "peerness" of the two devices 1,2. If the device 1,2 e.g. meet again after their initial security association has expired, they will have to go through the initial proximity discovery procedure again.

The exemplary embodiment of FIG. 5 may become computationally extensive if a target device 2 has to calculate 108 the hash over every incoming hashed T-BID 31. This may be reduced by relying on the network 3 to indicate when to listen for broadcasts. Alternatively, this may be reduced by concatenating the number of the broadcast hash (so add n−k to the broadcast). In that way, the target device 2 can check whether it expects a (n−k)$^{th}$ hash from one of its peers and then decide to calculate 108 the (recursive) hash(es) for the incoming broadcast.

The proximity discovery procedure of FIG. 5 advantageously works even when there is no network coverage (the network doesn't have to be involved). Moreover, it has a mechanism to forget the peers after some time, which may be used for charging or subscription purposes, and allows for a mechanism to decrease the computational load of calculating recursive hashes on all incoming broadcasts 103.

As a variant to the example of FIG. 5 it is possible that the devices 1,2 themselves decide what random to use to encrypt the identifier 12. When the identifiers have been exchanged, e.g. in a preceding proximity detection procedure or provided by the network, the network or a third party does not have to be involved for establishing the device-to-device communication session. This alternative procedure may work as follows.

First, a source device 1 calculates a random 51 and calculates hash(R∥T-BID), R being the random 51 an T-BID being an identifier 12. The T-BID may e.g. be a peer specific T-BID (e.g. b or j as shown in the table of the example of FIG. 2) meaning that it can specify who is calling or who is called. The T-BID may e.g. be a Security Association T-BID (SA-T-BID) if one has been specified.

Next, the source device 1 broadcasts R∥hash(R∥T-BID). The target device(s) 2 that receive the broadcast calculate for the T-BIDs in their memory (possibly including their own) the function hash(R∥T-BID) and determine whether they match. If a match is found, the conclusion that can be drawn depends on what T-BID is broadcast. If the source device 1 broadcast a T-BID representing its own identity, it may be concluded by the target device 2 that the source device 1 is within reach. If the source device 1 broadcast a T-BID representing the identity of the target device 2, then only the target device 2 that is the called party will find a match with their own identity. Malicious users may still find that the target device 2 is being called, but can't find out who is calling. If the source device 1 broadcast T-BIDs from a common security association (which may include T-BIDs of the source device 1 and/or the target device(s) 2 and/or a T-SA-BID), then the target device 2 can determine that he is being called.

An advantage of this variant of FIG. 5 advantage is that the source device 1 itself can determine how to make itself known and it provides a high degree of privacy, while allowing for a network to discover who is broadcasting. The latter is advantageous for e.g. charging reasons or Legal Interception. A further advantage is that the network need not be involved and the procedure thus also works without network coverage.

Figure 6:
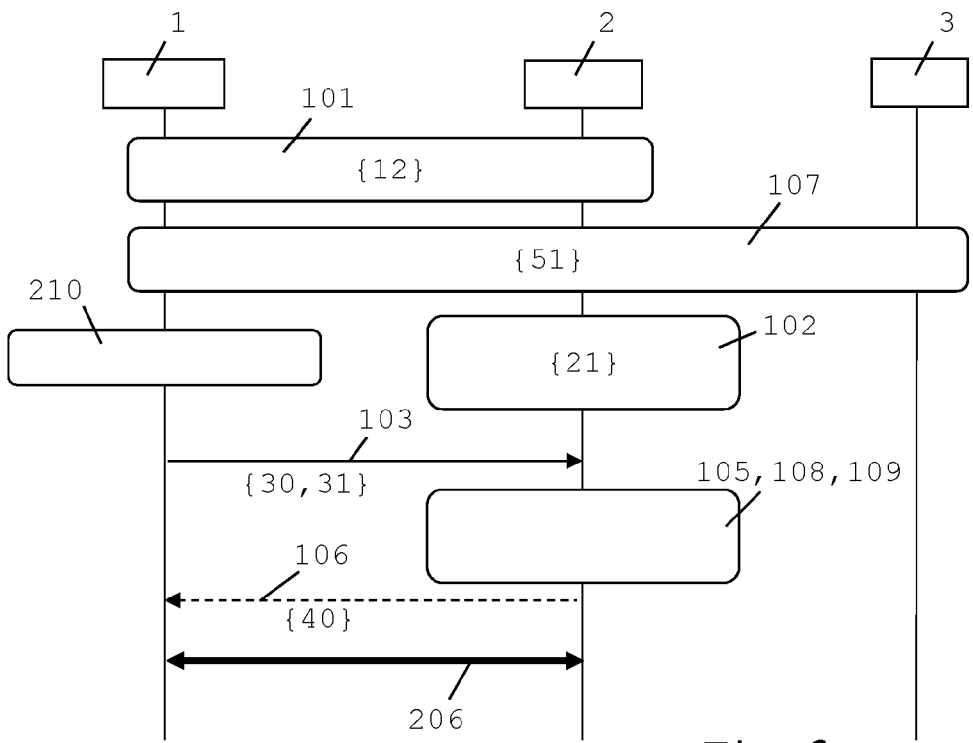

The example of FIG. 6 shows a hybrid solution, wherein the network or a third party provides a salt to be used in the hash functions. The example of FIG. 6 is a variant to the examples of FIG. 4 and FIG. 5 and is particularly advantageous in case of many peers 1,2 with a high probability of meeting again. The peers 1,2 retain information about each other, such as the identifier 12, that they may use in later sessions to identify one another or to find a next T-BID.

In the example of FIG. 6 two device 1,2 that are in a device-to-device session both generate a random T-BID. They inform 101 each other of the T-BID 12 chosen. At predefined moments in time, e.g. every night or at a predefined time interval, the network 3 (or any other third party) distributes 107 salts 51 to the device 1,2. Optionally or alternatively, the network 3 (or third party) may provide 107 the salt upon detection that two device 1,2 are close and would like to chat. The target device(s) 2 obtain 102 a first representation 21 of the known T-BIDs 12 of the devices 1,2, i.e. as received in the inform step 101, by calculating hash(T-BID,salt) for all T-BIDs 12. The source device performs the same calculation 210 for its own T-BID 12 by calculating a second representation 31 of the T-BID 31 used by the source device 1. The second representation 31 of the T-BID is broadcast 103 and is received in the target device(s) 2. The target device(s) 2 compare 105,108 the calculated first representation 21 of the T-BIDs with the received second representation 31 of the T-BID 12 and verify 109 if a match is found.

An advantages of the example of FIG. 6 is that it is computationally less intensive than the examples that rely on quickly changing parameters, such as the receive random, and calculating the hash each time the random is received. It still provides a sufficient privacy for the broadcaster 1 of the identifiers 12.

FIGS. 1-6 show different examples of exemplary embodiments of the invention. The invention is not limited to the shown examples. Steps shown in one example may e.g. be used in other examples although not shown. Examples of this are the hashing of identifiers, the making use of tickets, the additional challenge-response verification, and encrypting data using an encryption key 14. Other steps shown may be optional, such as the transmission 106 of the acknowledgement message 40 and the establishment of a device-to-device communication session 206.

In some of the examples hash functions are used to calculate derivations 21,31 of the identifier 12. It is to be understood that any other mathematical function may be used instead that uses a random 51 to create the derivations 21,31. The random 51 may e.g. be a random number or a derivation thereof generated in the server 3 or in the source device 1, a salt generate in the server 3 or in the source device 1.

Identifiers 12 may be used for group addressing. E.g. a T-BID may be used to indicate that a certain group of devices 1,2 is being called. The devices 1,2 belonging to a group receive an identifier 12 that represents the group. To discover other devices, the devices calculate a derivation of the identifier 12, e.g. depending on a current date and/or time or any other random 51 that can be commonly known by the devices 1,2 without exchanging the random 51. The second derivation 31 of the identifier may thus be calculated as x=hash(date||GroupIdentifier). The source device 1 broadcasts 103 x and the target device(s) 2 of the group receive x and calculate a first derivation 21 of the identifier by performing the same calculation hash(date||GroupIdentifier). If a first derivation 21 matches the third derivation 31 the proximity discovery is successful.

In general, if the random 51 is a time variant parameter, the random 51 may be chosen such that is changes slowly, e.g. once a day in case the random 51 is the current date. In that case the calculation of the hash(date||GroupIdentifier) or hash(date||identifier) may be calculated only once a day. Once that calculation is done only comparisons 109 have to be made. In the example of FIG. 5 and FIG. 6 this may advantageously result in having to perform less calculations as the hashes of the other devices are to be calculated only once a day.

One embodiment of the invention may be implemented as a program product for use with a computer system. The program(s) of the program product define functions of the embodiments (including the methods described herein) and can be contained on a variety of non-transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

The invention claimed is:

1. A method for proximity discovery between a source device and one or more target devices, the method comprising:
   receiving in the source device a first data comprising an identifier, wherein the identifier is a temporary broadcast identifier uniquely identifying the one or more target devices and wherein the identifier is associable with the source device by the one or more target devices;
   receiving in the one or more target devices a second data comprising a first representation of the identifier;
   broadcasting by the source device a signal comprising a second representation of the identifier;
   receiving in the one or more target devices the signal; and
   comparing in the one or more target devices the first representation of the identifier with the second representation of the identifier to obtain a comparison result for establishing a successful proximity discovery.

2. The method according to claim 1, further comprising transmitting from the one or more target devices to the source device an acknowledgement message depending on the comparison result.

3. The method according to claim 2, wherein:
   the source device and the one or more target devices are configured to be communicatively connected to a network and wherein the first data and the second data are received from one of a server in the network or the source device.

4. The method according to claim 3, further comprising receiving in the one or more target devices a third data comprising a a random number, wherein the first representation of the identifier is a derivation of the identifier obtained by a first mathematical function that uses the identifier and the random number as input to calculate the derivation of the identifier,
   and wherein the comparing step comprises:
   calculating a derivation of the identifier using a second mathematical function identical to the first mathematical function that uses the second representation of the identifier and the random number as input; and
   comparing the calculated derivation of the identifier with the first representation of the identifier,
   wherein the random number is one of:
   (i) a random number generated in the server or in the source device,
   (ii) a salt generated in one of the server or the source device, or (iii) a derivation of a further random number obtained in one of the server or the source device by a third mathematical function that uses the further random number and an source identifier identifying the source device as input to calculate the derivation of the random number.

5. The method according to claim 3, wherein the second data further comprises a ticket identifier, the method further comprising:
receiving from the server in the source device ticket data comprising the ticket identifier, the first data and a fourth data;
transmitting from the one or more target devices to the server the ticket identifier to obtain a copy of the fourth data associated with the ticket identifier; and
receiving from the server in the one or more target devices the copy of the fourth data,
wherein the acknowledgement message comprises the copy of the fourth data for verification with the fourth data in the source device.

6. The method according to claim 5, further comprising:
receiving from the source device in the one or more target devices first challenge data; and
calculating in the one or more target devices derivated first challenge data using a fourth mathematical function on the first challenge data,
wherein the acknowledgement message further comprises the derivated first challenge data and second challenge data, and the method further comprises:
calculating in the source device derivated first challenge data using a fifth mathematical function identical to the fourth mathematical function on the first challenge data for comparison with the received derivated first challenge data;
calculating in the source device derivated second challenge data using a sixth mathematical function on the second challenge data;
transmitting the derivated second challenge data to the one or more target devices;
calculating in the one or more target devices derivated second challenge data using a seventh mathematical function identical to the sixth mathematical function on the second challenge data for comparison with the received derivated second challenge data.

7. The method according to claim 6, wherein the ticket data further comprises an encryption key, wherein the method further comprises receiving from the server in the one or more target devices the encryption key associated in the server to the ticket identifier, and wherein the fourth, fifth, sixth and seventh mathematical function comprises a cryptographic function using the encryption key.

8. The method according to claim 3, further comprising charging by an operator of the server of a request for at least one of the first data, the second data or ticket data from one of the source device or the one or more target devices.

9. The method according to claim 1, wherein the identifier, the first representation of the identifier and the second representation of the identifier are identical.

10. A source device configured for performing a proximity discovery procedure with one or more target devices, the source device comprising:
one or more processors and instructions stored in memory that when executed by the one or more processors cause the source device to carry out operations including:
receiving a first data comprising an identifier, wherein the identifier is a temporary broadcast identifier uniquely identifying the one or more target devices and wherein the identifier is associable with the source device by the one or more target devices;
broadcasting a signal comprising a second representation of the identifier to the one or more target devices, wherein a second data comprising a first representation of the identifier is received in the one or more target devices,
and wherein the one or more target devices are configured to receive the broadcasted signal and compare the first representation of the identifier with the second representation of the identifier to obtain a comparison result for establishing a successful proximity discovery.

11. A target device configured for performing a proximity discovery procedure with a source device, the target device comprising:
one or more processors and instructions stored in memory that when executed by the one or more processors cause the target device to carry out operations including:
receiving a second data comprising a first representation of an identifier, wherein a first data comprising the identifier is received by the source device, and wherein the identifier is a temporary broadcast identifier uniquely identifying the one or more target devices and wherein the identifier is associable with the source device by the one or more target devices;
receiving a signal broadcast by the source device, the signal comprising a second representation of the identifier; and
comparing the first representation of the identifier with the second representation of the identifier to obtain a comparison result for establishing a successful proximity discovery.

12. A network comprising:
a source device configured for: receiving a first data comprising an identifier, wherein the identifier is a temporary broadcast identifier uniquely identifying the one or more target devices and wherein the identifier is associable with the source device by the one or more target devices, and broadcasting a signal comprising a second representation of the identifier; and
a target device configured for: receiving a second data comprising a first representation of the identifier, receiving the broadcasted signal, and comparing the first representation of the identifier with the second representation of the identifier to obtain a comparison result for establishing a successful proximity discovery.

* * * * *